United States Patent [19]
Thary

[11] Patent Number: 5,142,757
[45] Date of Patent: Sep. 1, 1992

[54] METHOD OF MAKING AN UPHOLSTERED CUSHION ARTICLE

[76] Inventor: Christian Thary, Poste Restante, 91150 Etampes, France

[21] Appl. No.: 685,610

[22] Filed: Apr. 15, 1991

Related U.S. Application Data

[63] Continuation of Ser. No. 371,256, Jun. 26, 1989, abandoned.

[51] Int. Cl.⁵ .............................................. B68G 7/00
[52] U.S. Cl. ................................ 29/91.1; 264/46.6; 264/46.7; 297/452; 297/DIG. 1
[58] Field of Search ............... 29/91.1, 447, 448, 469; 264/46.4, 46.6, 46.7; 297/452, DIG. 1

[56] References Cited

U.S. PATENT DOCUMENTS

| | | | |
|---|---|---|---|
| 3,736,022 | 5/1973 | Radke | 297/DIG. 1 |
| 3,961,823 | 6/1976 | Caudill, Jr. | 297/DIG. 1 |
| 4,039,363 | 8/1977 | Robertson | 297/DIG. 1 |
| 4,190,697 | 2/1980 | Ahrens | 264/46.6 |
| 4,347,213 | 8/1982 | Rogers, Jr. | 264/46.4 |
| 4,405,681 | 9/1983 | McEvoy | 264/46.4 |
| 4,665,606 | 5/1987 | Saito et al. | 29/448 |
| 4,738,809 | 4/1988 | Storch | 297/DIG. 1 |
| 4,837,905 | 6/1989 | Sullivan et al. | 29/448 |

Primary Examiner—P. W. Echols
Attorney, Agent, or Firm—Niro, Scavone, Haller & Niro

[57] ABSTRACT

A method and structure for manufacture of a foam cushion article. The method of constructing the cushion article does not require the use of a conventional mold and is performed by placing a frame within the space to be filled with foam. Fabric is then disposed around the frame in a step toward the formation of a preselected geometric shape for the cushion article. Subsequently, a skeletal assembly is positioned externally against the fabric in a final step to achieve the preselected geometric shape. The method allows production of a structure which includes selected areas of fabric bonded and unbonded to foam material. The method also allows substantial degrees of freedom in generating and positioning regions of preformed cushions or of different density foam cushions and in controlling overall strength and bonding between the different cushions and the fabric.

21 Claims, 1 Drawing Sheet

METHOD OF MAKING AN UPHOLSTERED CUSHION ARTICLE

This is a continuation of co-pending application Ser. No. 07/371,256 filed on Jun. 26, 1989, now abandoned.

BACKGROUND OF THE INVENTION

The present invention relates generally to an upholstered cushion article. More particularly, the invention relates to a structure and method for preparing an upholstered multi-density cushion article without having to use a conventional mold during the manufacturing process.

Well established methods of manufacturing upholstered cushion articles have involved cutting the covering material in accordance with a chosen pattern, sewing the material and then mounting the material on a cushion. This method of manufacture, however, usually involves high labor costs associated with the cutting and sewing operations.

In order to reduce the labor costs associated with the traditional manufacturing method, a pour-in-place, or foam-in-cover, technology was developed (see, for example, "New Methods for the Production of Comfortable Car Seats", K. Bukowski and W. Schoberth, S.A.E. Technical Paper Series, National Congress and Exhibition, Detroit, Mich., Feb.-Mar., 1985). This method is usable for either vinyl or laminated fabric cover materials. The cover material is usually first heated and then drawn into a cold mold by a vacuum applied between the mold and the cover material. As the covered material cools, it assumes the shape of the mold. A foamable material is then introduced into the mold to form the foam cushion portion of the cushion article. This technology enables relatively rapid and efficient manufacture of cushion articles, but requires the use of rather expensive capital equipment.

Other techniques exist for improving the manufacturing process, such as the method of injecting a cream foam into a preformed, porous bun. This method is a reliable method of preparing finished cushion articles having widely different densities and compressibilities. However, this approach of preparing different density cushion articles requires a relatively large number of individualized process steps which causes the cost of production to be quite high. In another approach, different density cushion articles are prepared independently, and the articles are bonded or glued together. Again, however, a relatively large number of steps are required to achieve a finished multi-density cushion article, and consequently the manufacturing cost is relatively high. In order to reduce the number of production steps, equipment has been developed which deposits different density foam at different locations, thus providing a multi-density cushion article in one step (see, U.S. Pat. No. 4,379,859). Unfortunately, this technology does not produce a well defined boundary between the different density regions. Futhermore, this method requires a large amount of capital for the purchase and maintenance of the equipment. Consequently, the increased capital and operating costs make such preparation methods uneconomical for most manufacturers of cushion articles.

SUMMARY OF THE INVENTION

A primary object of the invention is to provide an improved structure and method of manufacture for upholstered cushion articles.

It is another object of the invention to provide a new structure and method of manufacture for a cushion article formed without a conventional mold.

It is an additional object of the invention to form a multi-density cushion article with fabric bonded to selected portions of the cushion to optimize cushion function and fabric wear.

It is a further object of the invention to provide an improved method of manufacturing a cushion article having firm side bolsters and softer central portions.

It is another object of the invention to provide a frame with a coupled cushion article and a skeletal assembly external to the cushion article which cooperate to achieve a preselected shape for the cushion article.

A feature of the cushion article in accordance with the invention is the forming of a first foam cushion, attaching a frame thereto, placing a fabric about the first cushion and the frame, positioning a skeletal assembly externally against the fabric which cooperate with the internally positioned frame to define a preselected geometric shape. A foamable material is injected into the cavity formed by the fabric to form a second foam cushion which is coupled to portions of the frame, and fabric and to selected portions of the first cushion. Consequently, a cushion article is formed without a conventional mold in fewer steps and does not require the degree of capital equipment normally used in other production methods. The first cushion and the fabric are positionable to enable selection of the portions of the fabric cover to be bonded to the foam material of the second cushion, and this allows control of fabric wear. The fabric is itself bondable to the foam cushions, depending on the degree of diffusion of the foam into and through the fabric. The degree of diffusion is controlled by the porosity of the fabric and by the use of laminates on the fabric. The first cushion is also positionable at a number of locations within the cushion article to provide compressibility control. The cushion article may be of multi-density construction by using different density foams and by selectively positioning cushions of different density within and in addition to the first and second foam cushions.

Further objects and advantages of the present invention, together with the organization and manner of operation thereof, will become apparent from the following detailed description of the invention when taken in conjunction with the accompanying drawings wherein like reference numerals designate like elements throughout the several views.

DESCRIPTION OF PREFERRED EMBODIMENTS

Figure 1:
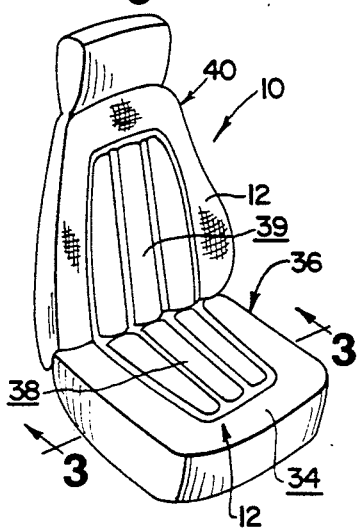
FIG. 1 is a perspective view of an exemplary automobile seat having an upholstered cushion article constructed with the apparatus and method of the present invention.
Figure 2:
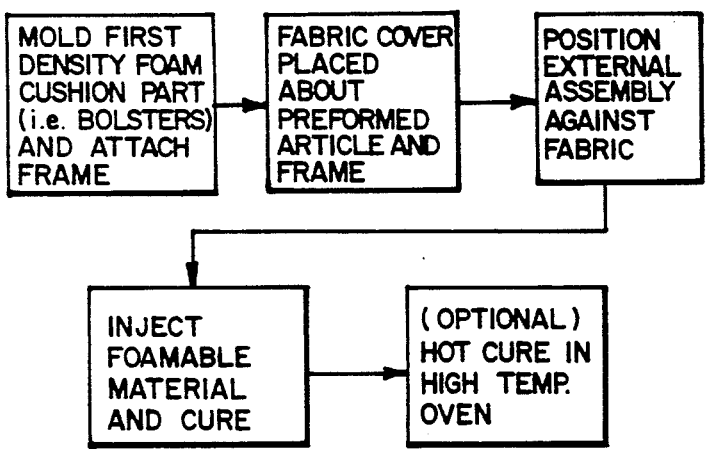
FIG. 2 is a block diagram presenting the method of manufacturing a multi-density cushion article.
Figure 3:
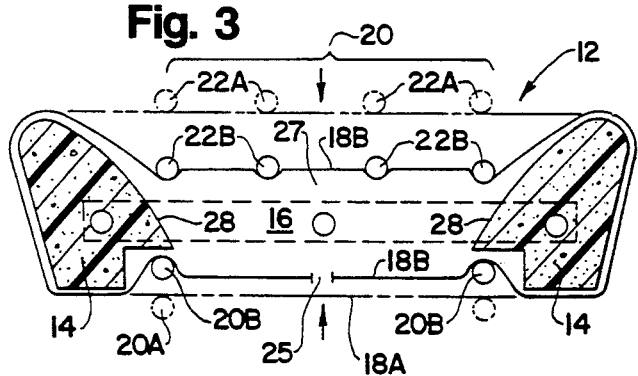
FIG. 3 is a transverse sectional view taken substantially along line 3—3 of FIG. 1.

Referring now to the drawings and in particular to FIGS. 1 and 2, a seat 10 is shown having cushion articles 12 constructed in accordance with one embodiment of the present invention. As shown in FIG. 2, the cushion article 12 is constructed by preparing a first cushion 14 (FIG. 3) which is one or more discrete segments attached to a frame 16. These various segments of the first cushion 14 can be of different density. A piece of fabric 18 is positioned about the frame 16 and the first cushion 14. Initially, the fabric 18 takes the position shown as the dashed and dotted lined 18A in FIG. 3. A skeletal assembly 20 is comprised of independently positionable probes, such as cylinders 22A; and the skeletal assembly 20 is shown in FIG. 3 in initial contact externally with the fabric 18A. In order to achieve a preselected geometric shape for the cushion article 12, the cylinders 22A in contact with the fabric 18, are moved to a final external contact position, as represented by the cylinders 22B in contact with the fabric 18B. Therefore, the combination of the frame 16 and the appropriately positioned fabric 18 enable formation of the first cushion 14 without a mold. The internally positioned frame 16 in combination with the first cushion 14 acts in part as an interior skeleton, or framework, for establishment of a portion of the preselected geometric shape. The skeletal assembly 20 further defines the position of the fabric 18 to achieve the completed, preselected geometric shape with the final position of the fabric 18B shown as the full lines in FIG. 3. In another form of the invention the first cushion 14 is not utilized and instead the frame 16 and additional parts of the externally positioned skeletal assembly 20, such as the cylinders 22A, are used to define the preselected geometric shape.

Figure 4:
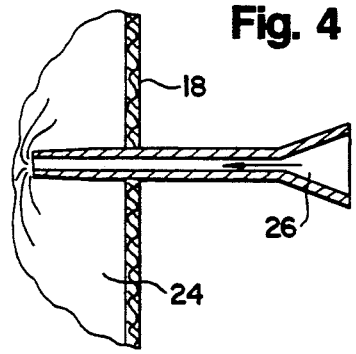
FIG. 4 is a fragmentary sectional view taken substantially along line 4—4 of FIG. 3.
Figure 5:
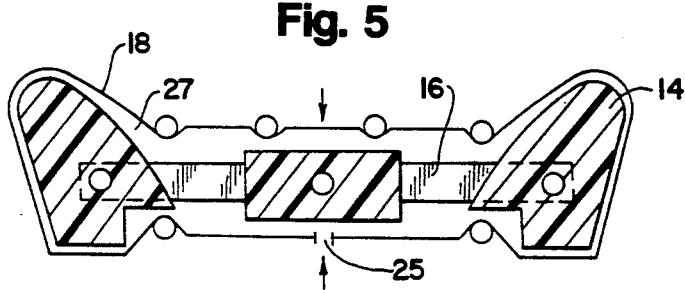
FIG. 5 is a transverse sectional view taken through a cushion frame member disposed transversely as shown in the bottom cushion of FIG. 1.

Once the preselected geometric shape is achieved, the cavity shown in FIG. 3 and 5 formed within the appropriately positioned fabric 18 is filled with foam 24 through an opening 25 by selectively inputting a foamable material 26 (See FIG. 4). In the embodiment of FIG. 5 the foam 24 has formed a second cushion 27. In a preferred embodiment the second cushion 27 has a different density then the first cushion 14. The second cushion 27 bonds to exposed surfaces, such as, for example, to the cushion frame 16, the fabric 18 and the contiguous surface boundary shared with the first cushion 14. Once the foam 24 has stiffened to form the second cushion 27 and exhibit sufficient strength, the skeletal assembly 20 is removed and further treatments can take place, such as an optional hot curing step and various assembly operations.

In a preferred embodiment the first cushion 14 is of higher density than the second cushion 27; and as shown in FIG. 1, the first cushion 14 forms a side bolster 34 of the seat bottom 36 with the second cushion 27 forming a softer center portion 38 of the seat bottom 36 and a softer center portion 39 of a seat back 40. In one form of the invention the first cushion 14 can be prepared prior to the other components by other methods, such as injecting a cream foam into a bun, or envelope, with the foam percolating through the network of porosity and stiffening to form the finished product.

In one embodiment of the invention the degree of bonding is controllable between the foam 24 and other materials which are in contact with the foam 24, such as the fabric 18 and the first cushion 14. The characteristics of the porosity of the fabric 18 and the porosity of any intervening cushion determine the degree of diffusion of the foam 24 into the fabric 18, as well as the consequent strength of the bond formed between the foam 24 and both the fabric 18 and the second cushion 27. The designer also can control whether the foam 24 contacts certain fabric areas or selected regions of a preformed foam cushion. For example, this control of contact areas is attainable by attaching the fabric 18 selectively to the preformed foam cushion, such as by sewing the fabric along a seam of the first cushion 14. The foam 24 cannot penetrate beyond this seam to predetermined areas of the first cushion 14. Consequently, an outer area 32 of the first cushion 14 is unbounded, and the fabric 18 is loosely fitted in this outer area 32. This type of resilient structural state for the fabric is advantageous because the deleterious effect of a rubbing action such as from contact of a car seat with an adjacent door during car motion, is ameliorated by the loose fit. However, if there were a foam bond to the fabric 18 in the outer area 32 and the rubbing action were present, the lack of the above described type of resilience would result in premature wear of the fabric 18 and generation of a tear or hole. Other means of preventing bonding of a given foam cushion to the fabric 18 include the use of a laminate on the fabric 18. One can completely eliminate a bond to the fabric 18 by placing the laminate on the inside surface of the fabric 18 facing the foam 24. Alternatively, the designer can control the degree of the bonding to the fabric 18 by various degrees of laminate penetration from the outside portion of the fabric 18.

In another form of the invention the first cushion 14 is formed in place with the rest of the cushion article 12. This can, for example, be accomplished by installing barrier means about the formation region of the first cushion 14. The barrier means is, for example, any material able to prevent foam diffusion therethrough. With this structural feature, different types and densities of cushions for the cushion article 12 can be formed at substantially the same time to conserve processing time. The barrier means can be controlled to allow formation of the selectable zone of contact, enabling formation of certain bonded regions for the first and second cushions 14 and 27, respectively. Alternatively, the barrier means allows formation of the first cushion 14 or the second cushion 27 subsequent to the other in order in part to control the type of foam bond formed, such as for example, diffusion of a higher density material into a lower density material, or vice versa. The barrier means can thus be used to control compressibility and general bonding character in selected portions of the boundary region between different cushions. Additional control of compressibility is also available by selectively inserting different densities and types of cushion or bolster segments in the cushion article 12.

In other forms of the invention the designer can form regions of at least a third density or different type of cushion in order to provide the optimum comfort and fit for the anticipated use. In the manner described hereinbefore, such regions can be preformed and inserted into the cushion article 12 or formed in place.

In another form of the invention the fabric 18 undergoes a heat setting operation prior to commencing the manufacture of the cushion article 12. Preferably, the fabric 18 is in an "unfinished" form prior to the heat setting operation. The term unfinished refers to fabric in the as-produced state, typically a flat state, which has not been subjected to any treatment intended to impart to the cloth a permanent dimensional or shape memory or to set or fix intersection of yarn. The use of unfinished fabric usually tends to retain the heat set shape characteristics better than a material which has already been finished. The heat setting operation can be performed on a selected mold prior to the manufacturing step or can be performed after being placed about the frame 16 and after positioning of the skeletal assembly 20.

The present invention provides important advantages in forming cushion articles for any conceivable application, such as for vehicle seats, airplane seats, home and office furniture, floor coverings and the like. The invention enables the inexpensive and efficient manufacture of cushion articles without the use of a conventional mold. The product cushion articles 12 have high quality features, such as good bonding strength between cushions formed at different times or cushions of different density and also between a foam cushion and its fabric covering. The resulting cushion articles also have clear definition between different density regions and provide excellent wear resistance for selected high wear regions. Cooperation among the frame 16, the fabric 18 and the skeletal assembly 20 provide substantial freedom in controlling the preselected geometric shape. The location of different density regions in the cushion article 12 is selectable and enables control of the compressibility of the cushion article 12.

While preferred embodiments of the present invention have been illustrated and described, it will be understood that changes and modifications can be made without departing from the invention and its broader aspects. Various features of the invention are defined in the following Claims.

What is claimed is:

1. A method of manufacturing a multi-density cushion article covered with fabric having a preselected geometric shape, comprising the steps of:
   (a) constructing a frame and a first foam cushion subassembly, said first cushion having a first density and comprising a peripheral portion of said subassembly;
   (b) assembling the fabric about said subassembly to form a cavity;
   (c) positioning a skeletal assembly comprising a plurality of discrete members against discrete portions of said fabric such that said skeletal assembly and said frame hold the fabric in the preselected geometric shape; and
   (d) injecting a foamable material into said cavity formed by the fabric, whereby said foamable material forms a second foam cushion having a second density and is coupled to said first foam cushion.

2. The method as defined in claim 1 further including the step of curing said multi-density cushion article by heating said multi-density cushion article after said formation of said second foam cushion.

3. The method as defined in claim 1 wherein said foamable material comprises a cream foam.

4. The method as defined in claim 1 further including the step of heat setting said fabric prior to said step of assembling said fabric to said frame and first foam cushion.

5. The method of claim 1 wherein said first foam cushion comprises discrete segments.

6. The method of claim 5 wherein said segments of said first foam cushion have different densities.

7. The method as defined in claim 1 further including the step of forming a bond between selected portions of said first and second density foam cushions.

8. A method of manufacturing multi-density cushion article in a preselected geometric shape from foam material covered with fabric, comprising the steps of:
   (a) placing a frame in position for assembly of said multi-density cushion article;
   (b) assembling said fabric about said cushion frame;
   (c) positioning a skeletal assembly externally against said fabric such that said frame and fabric define said preselected shape;
   (d) forming a first cushion having a first density for attachment to said frame, said first cushion having surrounding barrier means for isolating said first cushion; and
   (e) injecting a foamable material into a cavity defined within said fabric, forming a second cushion having a second density of said foam material coupled to said frame.

9. The method as defined in claim 8 wherein said second cushion is partly coupled to said first cushion by removing part of said barrier means.

10. The method as defined in claim 8 further including a final step of curing s id multi-density cushion article by application of heat.

11. The method as defined in claim 8 wherein said foamable material comprises a cream foam.

12. The method as defined in claim 8 further including the step of heat setting said fabric prior to assembly to said frame.

13. The method as defined in claim 8 wherein subsequent to said step of forming said first cushion, said barrier means is removed resulting in said second cushion being attached to said first cushion.

14. The method as defined in claim 8 wherein said step of forming said first cushion comprises injecting an envelope with said foamable material.

15. The method as defined in claim 14 wherein said envelope comprises a material having a foam permeable cover.

16. The method as defined in claim 8 further including the step of forming a bond between said second cushion and said first cushion.

17. The method as defined in claim 16 wherein said bond forming step comprises diffusion said foamable material into said first cushion.

18. The method as defined in claim 8 wherein said fabric is bonded to selected portions of said first and second density cushions.

19. A method of manufacturing a cushion article covered with fabric, in a preselected geometric shape, comprising the steps of:
   (a) preparing a frame;
   (b) placing said fabric about said frame;
   (c) positioning externally against said fabric a skeletal assembly having a plurality of independently positionable probes to define said preselected geometric shape; and
   (d) forming a foam cushion within said fabric and coupled to said frame.

20. The method as defined in claim 19 wherein said step of forming said foam cushion comprises forming a plurality of foam cushions having different densities wherein at least a portion of each of said foam cushions is coupled to said frame.

21. The method of claim 19 wherein said frame comprises at least one preformed cushion and a coupled rigid frame member.

* * * * *